Oct. 13, 1964     E. W. MELL     3,153,136
BARBECUE DEVICE
Filed June 13, 1963
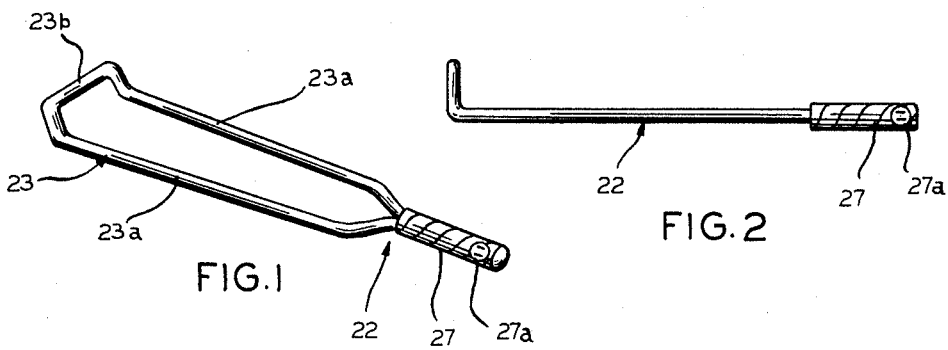
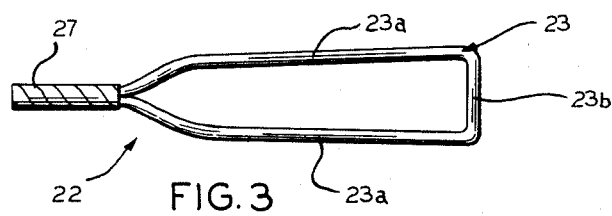
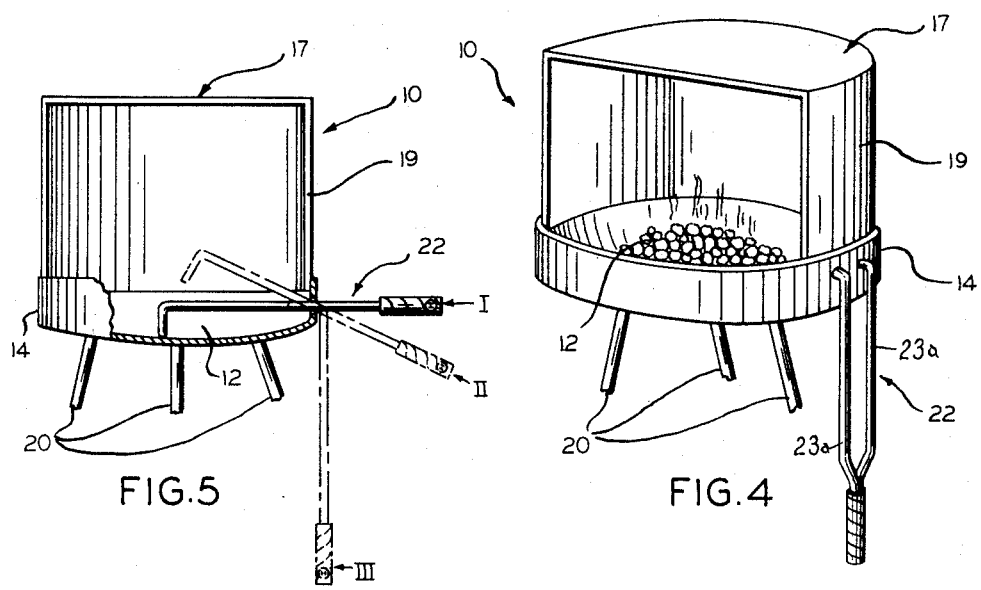
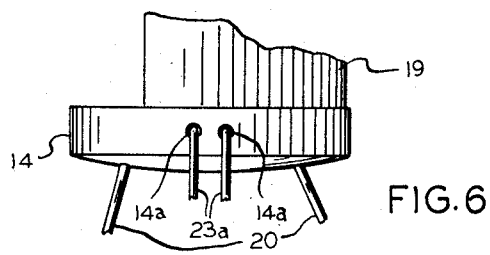
INVENTOR.
ERIC W. MELL
BY *Irwin C. Alter*
ATTORNEY

United States Patent Office 3,153,136
Patented Oct. 13, 1964

3,153,136
BARBECUE DEVICE
Eric W. Mell, Lake Bluff, Ill., assignor to Mell Manufacturing Company, Chicago, Ill., a corporation of Illinois
Filed June 13, 1963, Ser. No. 287,556
2 Claims. (Cl. 219—267)

This invention relates to barbecuing equipment and more particularly to a barbecue device which has a novel electrical fire starting means which is integrally incorporated in said device.

Prior art barbecuing devices having electrical firestarter means are of the type that the firestarter means was permanently installed and located in the firebed of a barbecue device or was a completely separate unit which was not associated with the barbecuing device. Both types of electrical firestarter means have their advantages and disadvantages. The permanently installed electric firestarter means which is located in the firebed of a barbecue device have the disadvantage of becoming disintegrated due to the high temperature of the firebed, but it has the advantage of convenience. The electrical starter means not associated with the barbecue device have the disadvantage of inconvenience due to their not being permanently accessible to an operator of a barbecue deice. However, they do not disintegrate quickly because they are not permanently located in the firebed.

My invention obviate the disadvantages inherent in both of the above type devices but yet it combines the advantages of both. I have provided a barbecue device which has a novel electric firestarter means which is integrally incorporated therein and it can be slidably withdrawn from the firebed through perforations after a fire has started and then positioned away from the intense heat of the firebed, but yet is still associated with the barbecue device so that it is conveniently accessible to an operator for the purpose of starting a fire in said firebed.

It is therefore an object of this invention to provide a new and improved electrical fire starter means.

It is further an object of this invention to provide an electrical firestarter means with a heating element that is shaped for slidable association with the firebed of a barbecue device so that once a fire is started it can be withdrawn away from the intense heat of said firebed while still remaining associated with said barbecue device.

It is further an object of this invention to provide a barbecue device having an improved integrally incorporated electrical firestarter means which can be withdrawn from the firebed away from the fire and still be associated with said barbecue device for conveniently starting another fire.

It is still even further an object of this invention to provide a barbecue device which has an integral electrical firestarter means which can be produced economically at a relatively lower cost than other integral starter means.

Other and further objects of this invention will become more readily apparent from the following detailed description, when taken in conjunction with the drawings, wherein:

FIGURE 1 is a perspective view of the improved electric starter means of my invention;
FIGURE 2 is a side elevational view of FIGURE 1;
FIGURE 3 is a top view of FIGURE 1;
FIGURE 4 is a perspective view of a new and improved barbecue device which has my novel electrical firestarter means incorporated therein;
FIGURE 5 is a partial sectional view illustrating my barbecue device and my electrical starter means in different positions for the purpose of illustrating the novel coaction therebetween; and FIGURE 6 is a partial side elevational view of FIGURE 4 illustrating how my electrical starter means is associated with the barbecue device.

Referring more in detail to the drawings, my new and improved barbecue device 10 is illustrated in FIGURE 4. The preferred embodiment has a firebed 12 having a vertical wall 14 defining the peripheral sides thereof, and having perforations 14a substantially midway between the ends of said wall as illustrated in FIGURE 6. My electrical firestarter means is shown protruding through the perforations 14a and being slidably associated therewith. A hood 17 is attached to the vertical wall 14 of the firebed and it has a wall 19 which extends partially around the firebed thereby allowing access to the firebed 12. The legs 20 are shown projecting from the bottom of the firebed 12 to support it on the ground.

The electrical starter means 22 has a heating element 23 which includes a pair of substantially parallel portions 23a, having first and second ends. The first ends are electrically connected by a transversely projecting U shaped retaining portion 23b. The second ends of said substantially parallel portions 23a converge together and have a handle 27 attached thereto, said handle 27 having a plug means 27a incorporated therein and electrically connected to the heating element 23 for furnishing an electrical power source to said heating element.

It will be seen that to construct my invention according to the preferred embodiment the heating element has its substantially parallel portions 23a threaded through the perforations 14a with the U shaped retaining portion 23b positioned in the firebed 12 and thereafter the handle 27 is assembled therewith.

The operation and coaction of my invention can be visualized from FIGURE 5. Initially the heating element 23 of the electrical firestarter means 22 is almost completely inserted in the firebed and is positioned in the firebed as illustrated by the Roman numeral I. When the firestarter means is in this position, it will be seen that the transversely projecting U shaped retaining portion 23b rests on the bottom of the firebed 12 and the electrical firestarter 22 has its substantially parallel portions 23a positioned in a manner that it will be midway between the top and bottom of the firebed so that it can be positioned in the middle of a stack of coals or other fuel rather than above or below the coals in the firebed. Once the fire is started the electrical firestarter means 22 is withdrawn by its handle 27 to the position noted by Roman numeral II by slidably withdrawing the heating element 23 through the perforations 14a. And finally the firestarter is left in a hanging position with its heating element 23 out of the area of intense heat projected by the firebed, this position being denoted by the Roman numeral III. It will be noted that the transversely extending U shaped portion acts as a retaining means to enable the heating element 23 of the electrical firestarter 22 to be withdrawn but yet to be hanging conveniently accessible if it is necessary to start another fire.

Although I have illustrated a preferred embodiment of this invention it should be realized that I intend this invention to cover other alternatives which are suggested by the spirit of this invention. For instance, the firebed and hood could be of any particular shape. It is merely necessary that the firebed or any component proximately located thereto has one or more perforations therein to slidably receive an electrical firestarter means for starting a fire and to enable withdrawal thereof away from the intense heat of the firebed to a position where it would be retained so that it would be conveniently accessible and associated with the firebed at all times.

It is also intended that other shapes of heating elements can be utilized for slidable association with the firebed of a barbecue device to achieve the advantages I intend. For instance, there could be more than two substantially parallel portions or there can be a heating element having at least one portion slidably mounted with respect to the perforations which has a retaining means of any shape that enables it to be slidably positioned for starting a fire and withdrawn and retained once the fire is started.

Although but one embodiment of the present invention has been illustrated and described it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. A barbecue device with a firebed having an integral firestarter means with a heating element that is withdrawable from the firebed of said device once a fire is started, comprising: a firebed with a perforated wall, an electrical firestarter including a heating element with a plurality of substantially parallel porions, said parallel portions having first and second ends, said substantially parallel portions protruding through said perforated walls, said first ends of said substantially parallel portions being inside said firebed and having a transverse projecting U shaped retaining portion attached thereto, said second ends being outside said firebed and having a handle attached thereto, electrical connection means incorporated in said handle for connecting an electrical power source, whereby said barbecue device has a firestarter that can be withdrawn from the firebed of said barbecue device by slidably withdrawing said substantially parallel portions through said perforations and positioning said firestarter to hang on said perforated wall away from the intense heat of a fire by its U shaped transversely projecting retaining portion.

2. A barbecue device, as defined in claim 1, wherein said perforations are located approximately midway between the top and bottom of said firebed wall, and said transverse U shaped retaining portion is disposed and has a certain length that enables it to rest on the bottom of said firebed when starting a fire in order that fuel can be stacked underneath and over said parallel portions of said heating element when said firestarter means is positioned for starting a fire.

References Cited by the Examiner

UNITED STATES PATENTS

| | | | |
|---|---|---|---|
| 2,775,966 | 1/57 | Huntley | 158—91 |
| 2,866,883 | 12/58 | Borden | 219—35.1 |
| 2,938,933 | 5/60 | McCutcheon et al. | 219—32 |
| 2,944,598 | 7/60 | Huntley et al. | 219—32 X |
| 2,982,840 | 5/61 | McCutcheon | 219—32 X |
| 2,996,597 | 8/61 | Persinger et al. | 219—34.12 |
| 3,046,381 | 7/62 | Olswang | 219—32 |

FOREIGN PATENTS 533,742  2/41  Great Britain.

RICHARD M. WOOD, *Primary Examiner.*